C. W. POOL.
POST AUGER.
No. 184,900. Patented Nov. 28, 1876.
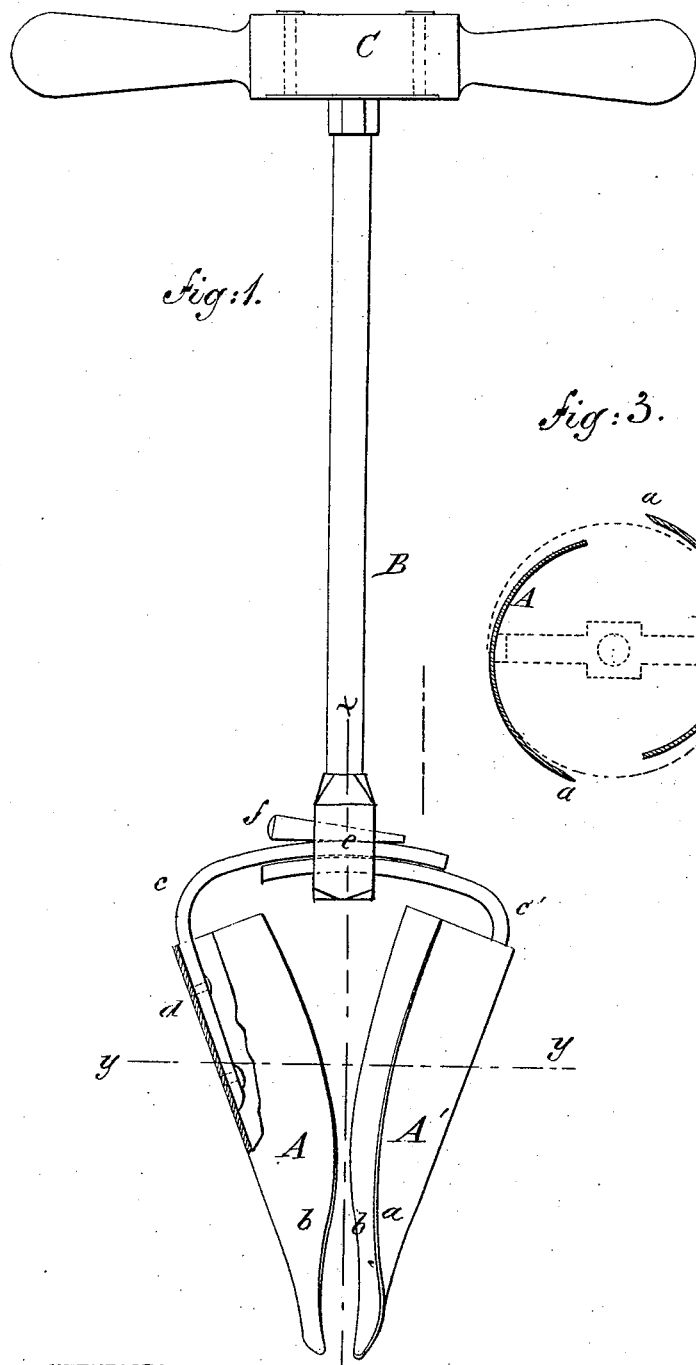
Fig. 1.
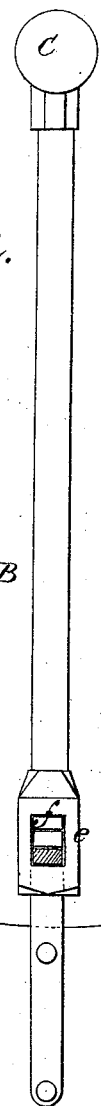
Fig. 2.
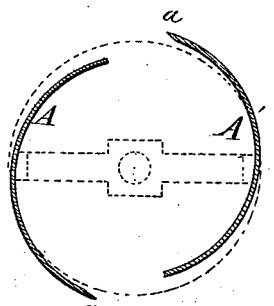
Fig. 3.
WITNESSES:
Chas. Nidta
John Goethals
INVENTOR:
Charles W. Pool
BY 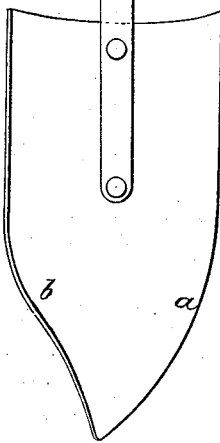
ATTORNEYS.

UNITED STATES PATENT OFFICE.

CHARLES W. POOL, OF WISCOY, NEW YORK, ASSIGNOR TO HIMSELF AND JAMES W. VAN BUSKIRK, OF SAME PLACE.

IMPROVEMENT IN POST-AUGERS.

Specification forming part of Letters Patent No. 184,900, dated November 28, 1876; application filed July 31, 1876.

*To all whom it may concern:*

Be it known that I, CHARLES W. POOL, of Wiscoy, in the county of Allegany and State of New York, have invented a new and Improved Post-Auger, of which the following is a specification:

Figure 1 is a side elevation, with a portion of one side broken away to show the details of construction. Fig. 2 is a section on line $x$ $x$ in Fig. 1. Fig. 3 is a transverse section on line $y$ $y$ in Fig. 1.

Similar letters of reference indicate corresponding parts.

My invention relates to augers for boring post-holes; and it consists in the combination of a pair of blades with adjustable supporting-arms, which are secured in a socket formed in the lower end of a shank, provided with a suitable handle.

A A' are blades, that are arc-shaped in cross-section, and are cut away at their cutting-edges $a$, on a curve forming a part of a circle, and on the opposite edge $b$ the blade is cut away on an ogee. These blades are riveted to the curved arms $c\ c'$, as shown at $d$, which are held in a mortise, $e$, in the shank B by a key, $f$. The arms $c\ c'$ overlap each other in the mortise, and are capable of being moved to vary the size of the hole to be bored. The blades A A' are twisted on the arms $c\ c'$, so as to throw the cutting-edges $a$ out, as shown in Fig. 3. This, together with the converging of the lower extremities of the blades, causes it to draw itself into the earth. The shank B is provided with a suitable handle, C, for turning the auger.

Having thus described my invention, I claim as new and desire to secure by Letters Patent—

The combination of the curved blades A A', shank B, having socket $e$, and arms $c\ c'$, fitting in said socket, and secured by means of a wedge, $f$, or its equivalent, substantially as and for the purpose described.

CHARLES W. POOL.

Witnesses:
W. G. WHITNEY,
DEWITT C. GRANGER.